United States Patent
Ulchak et al.

(10) Patent No.: US 9,688,480 B2
(45) Date of Patent: Jun. 27, 2017

(54) SPIRAL CONVEYOR BELT SYSTEM AND METHOD FOR DETERMINING OVERDRIVE OF THE SAME

(71) Applicant: Cambridge International Inc., Cambridge, MD (US)

(72) Inventors: Jeffrey D. Ulchak, Salisbury, MD (US); Thomas O. Perdue, Salisbury, MD (US)

(73) Assignee: Cambridge International Inc., Cambridge, MD (US)

( * ) Notice: Subject to any disclaimer, the term of this patent is extended or adjusted under 35 U.S.C. 154(b) by 0 days.

(21) Appl. No.: 15/075,354

(22) Filed: Mar. 21, 2016

(65) Prior Publication Data
US 2016/0272434 A1    Sep. 22, 2016

Related U.S. Application Data

(60) Provisional application No. 62/135,358, filed on Mar. 19, 2015.

(51) Int. Cl.
| | |
|---|---|
| *B65G 43/02* | (2006.01) |
| *B65G 21/18* | (2006.01) |
| *B65G 43/04* | (2006.01) |
| *G01P 3/42* | (2006.01) |
| *G06K 7/10* | (2006.01) |

(52) U.S. Cl.
CPC ............ *B65G 43/02* (2013.01); *B65G 21/18* (2013.01); *B65G 43/04* (2013.01); *G01P 3/42* (2013.01); *G06K 7/10366* (2013.01); *B65G 2203/046* (2013.01)

(58) Field of Classification Search
CPC ........ B65G 43/02; B65G 43/04; B65G 21/18; G06K 7/10366; G01P 3/42
USPC .......................................................... 198/778
See application file for complete search history.

(56) References Cited

U.S. PATENT DOCUMENTS

| | | | |
|---|---|---|---|
| 4,464,654 A | 8/1984 | Klein | |
| 5,191,267 A | 3/1993 | Machacek | |
| 7,779,994 B1 * | 8/2010 | Travis | B65G 43/02 198/810.01 |
| 8,618,929 B2 * | 12/2013 | Ganapathy | B65G 43/02 340/539.1 |
| 2003/0051979 A1 * | 3/2003 | Travis | B65G 43/02 198/498 |

(Continued)

OTHER PUBLICATIONS

Extended European Search Report mailed Jul. 26, 2016 in counterpart European Application No. 16161275.9 in the European Patent Office (10 pages).

*Primary Examiner* — Mark A Deuble
(74) *Attorney, Agent, or Firm* — Buchanan, Ingersoll & Rooney PC

(57) ABSTRACT

A conveyor belt system includes a spiral conveyor belt, a spiral conveyor cage structure adjacent the spiral conveyor belt, an RFID sensor integral to the spiral conveyor belt, and a plurality of antennas of a reader, the antennas being attached to the spiral conveyor structure. A method of using the conveyor belt system includes rotationally displacing the spiral conveyor belt relative to a portion of the spiral conveyor cage structure, obtaining and storing first time stamp data when the RFID sensor passes one of the plurality of antennas, and obtaining and storing second time stamp data when the RFID sensor passes another one of the plurality of antennas.

9 Claims, 3 Drawing Sheets

(56) References Cited

U.S. PATENT DOCUMENTS

| | | | |
|---|---|---|---|
| 2005/0109581 A1* | 5/2005 | Roland | B65G 21/18 198/778 |
| 2007/0102264 A1* | 5/2007 | Wallace | B65G 43/02 198/618 |
| 2007/0175736 A1* | 8/2007 | Bickel, Jr. | B65G 17/086 198/778 |
| 2011/0132724 A1 | 6/2011 | Buchkremer | |
| 2011/0137613 A1* | 6/2011 | Sakaguchi | B65G 15/08 702/183 |
| 2012/0168281 A1* | 7/2012 | Twigger | B65G 43/06 198/502.1 |
| 2012/0217132 A1* | 8/2012 | Twigger | B65G 43/06 198/502.1 |
| 2013/0213773 A1* | 8/2013 | Talsma | B65G 17/086 198/778 |

* cited by examiner

SPIRAL CONVEYOR BELT SYSTEM AND METHOD FOR DETERMINING OVERDRIVE OF THE SAME

TECHNICAL FIELD

The disclosure herein relates to systems and methods for providing measurements for determining the overdrive of a spiral conveyor.

BACKGROUND INFORMATION

RFID sensors are commonly used in various applications, including object tracking and providing unique identification. Typical applications include identification badges, toll collection and payment systems, building access control, and inventory and asset control. RFID sensors can be either active or passive. An active RFID system utilizes an onboard battery to transmit signals from the sensor to a reader according to a pre-determined rate or interval. Passive RFID sensors utilize the energy transmitted by an antenna on the reader to generate and signal a response from the sensor back to the reader as desired or requested. RFID technology can also be utilized in conjunction with a number of different sensors to measure and transmit data of various types such as, for example, temperature, pressure, and strain.

Side-flexing metal conveyor belts have been used in spiral conveyor applications for many years. In spiral conveyor applications, the belt is wrapped around a central rotating drum in a helical path to permit a long path within the confines of a relatively small overall footprint. The inherent strength, durability, and open but adequate product support area of these types of belts generally makes them a good option for spiral process conveyors.

For the belt to operate with a reduced tension, it is typically preferred that the rotational speed of the central drum exceed the linear speed of the belt. The difference in travel distances between the belt and the outer surface of the drum per one complete revolution of the belt is known as overdrive. Overdrive can be an important indicator of the proper setup of a spiral conveyor system. Changes in the value of the overdrive can alter the belt tension, which in turn can affect overall belt service life. Conventionally, the only reliable way to determine the overdrive of the spiral cage has been to manually measure the travel differential between the belt and the drum. In addition, overdrive on spiral conveyors with a belt that is moving quickly can be difficult if not impossible to accurately measure.

Therefore, there is a need for a system that more easily provides measurements for determining the overdrive of a spiral conveyor.

SUMMARY

An exemplary embodiment of a conveyor belt system according to the disclosure herein comprises a spiral conveyor belt, a spiral conveyor structure adjacent the spiral conveyor belt, an RFID sensor integral to the spiral conveyor belt, and a plurality of antennas of a reader, the antennas being attached to the spiral conveyor structure.

According to a further aspect of the disclosure, a method of using a conveyor belt system comprises providing a spiral conveyor belt, a spiral conveyor cage structure adjacent the spiral conveyor belt, an RFID sensor integral to the spiral conveyor belt, and a plurality of antennas of a reader, the antennas being attached to the spiral conveyor structure, rotationally displacing the spiral conveyor belt relative to a portion of the spiral conveyor cage structure, obtaining and storing first time stamp data when the RFID sensor passes one of the plurality of antennas, and obtaining and storing second time stamp data when the RFID sensor passes another one of the plurality of antennas.

BRIEF DESCRIPTION OF THE DRAWINGS

Other features and advantages disclosed herein will become more apparent from the following detailed description of exemplary embodiments when read in conjunction with the attached drawings, wherein.

DETAILED DESCRIPTION

Conveyor belt systems, and in particular spiral conveyor belt systems, are known in the industry. Examples are shown, for instance, in U.S. Pat. Nos. 5,133,449 and 6,360,882 to the present assignee, and which are hereby incorporated by reference in this application.

Figure 1:
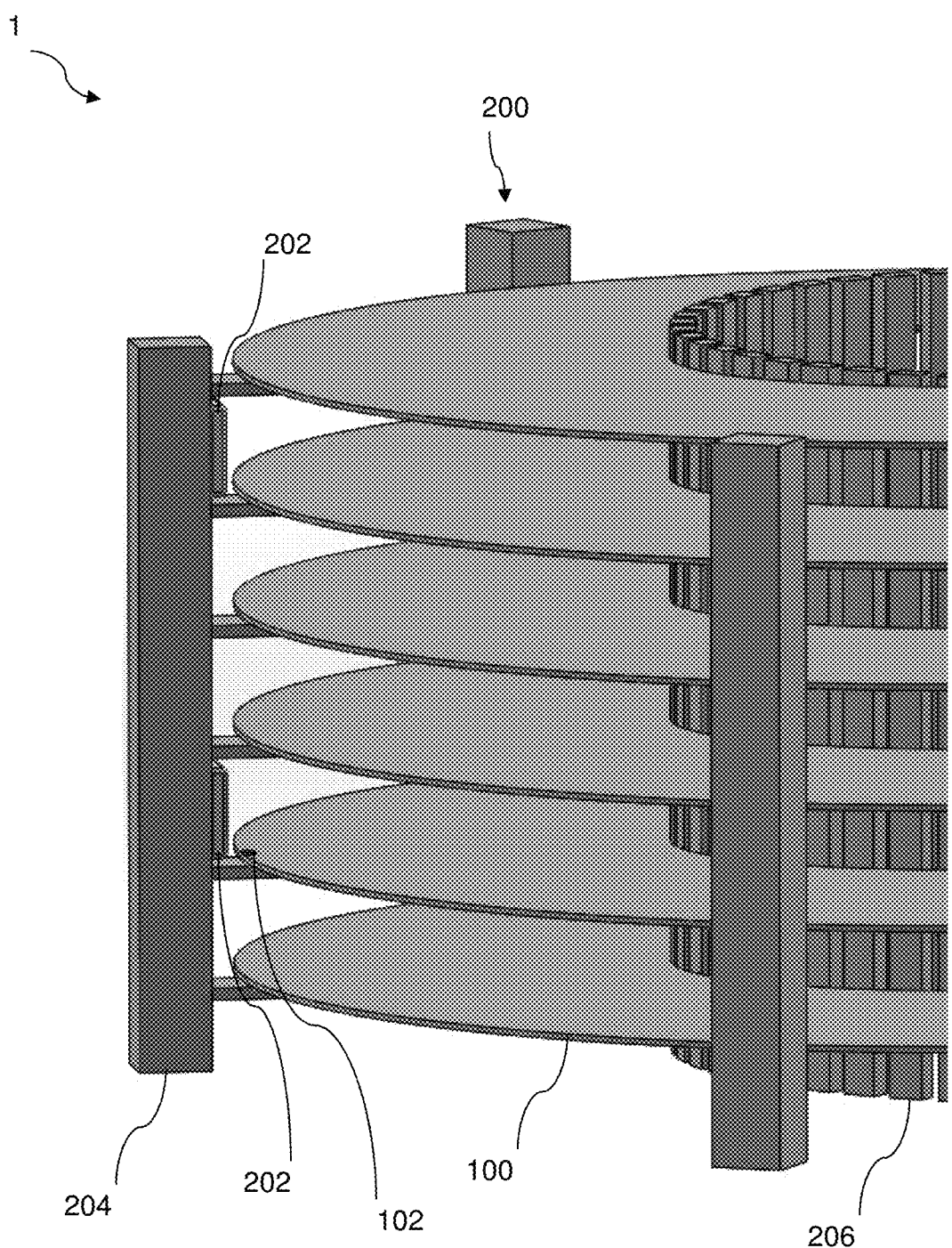
FIG. 1 is a schematic illustration of an illustrative embodiment of a conveyor belt system.

FIG. 1 shows a schematic illustration of an exemplary embodiment of a conveyor belt system 1, which includes a spiral conveyor belt 100, a spiral conveyor cage structure 200 adjacent the spiral conveyor belt 100, a sensor 102 integral to the spiral conveyor belt 100, and a plurality of antennas 202 of a reader. The antennas 202 are attached to the spiral conveyor structure 200. In a spiral cage conveyor, the belt travels in a helical or spiral direction and is driven by cage bars disposed within the center of the spiral which engage the inner edge of the conveyor belt.

In an illustrative embodiment, the spiral conveyor cage structure 200 comprises an outer portion 204 and an inner drum portion 206 configured to rotate relative to the outer portion 204.

In an illustrative embodiment, the sensor 102 comprises an RFID sensor that is integral to an outer edge of the spiral conveyor belt 100. For example, the RFID sensor 102 can be integral to the outer edge of the spiral conveyor belt 100 in such a way that it does not interfere (or minimally interferes) with belt articulation or product support.

The antennas 202 are preferably positioned at known fixed points on the spiral cage 200, within range of the RFID sensor, but separated so as not to overlap (or minimally overlap) the coverage of the antennas 202. In an illustrative embodiment, the antennas are positioned at even increments within a single complete wrap of the spiral conveyor belt 100 around the drum. Even spacing between the antennas 202 facilitates the determination of the time required for the spiral conveyor belt to complete a single revolution.

The spiral conveyor belt is a side-flexing conveyor belt, and preferably, the RFID sensor 102 is a passive RFID device.

Figure 2:
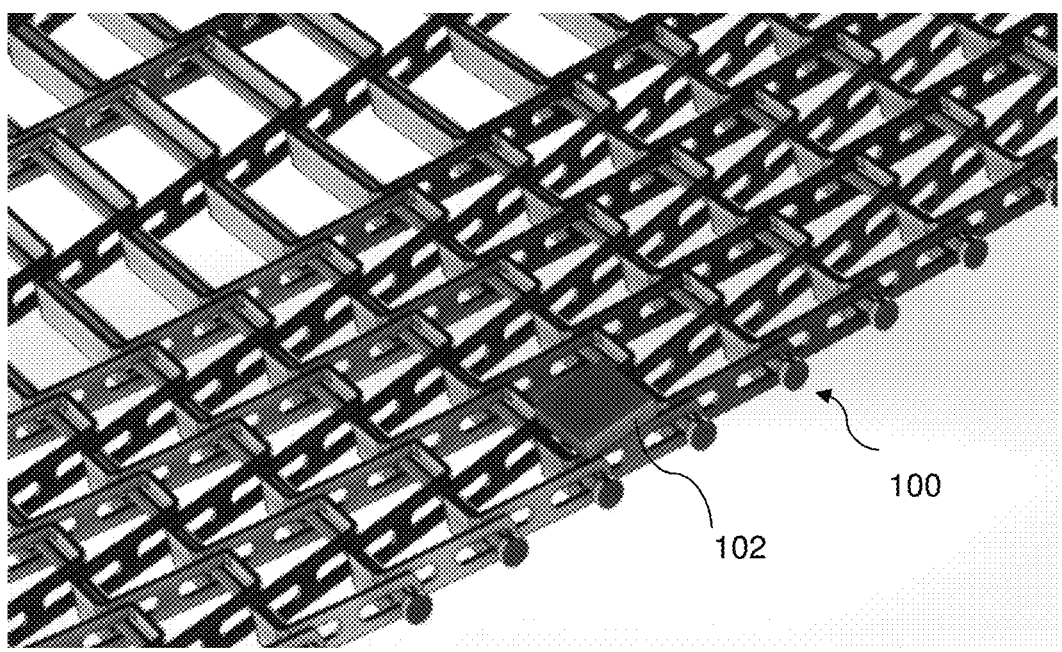
FIG. 2 is a schematic illustration of an illustrative embodiment of a conveyor belt with an integrated RFID sensor.

In the exemplary embodiment, the spiral conveyor belt 100 is a metallic conveyor belt. Further, although FIGS. 1 and 2 show a flatwire conveyor belt, variations of the disclosed sensor can be applicable to other types of belts.

Figure 3:
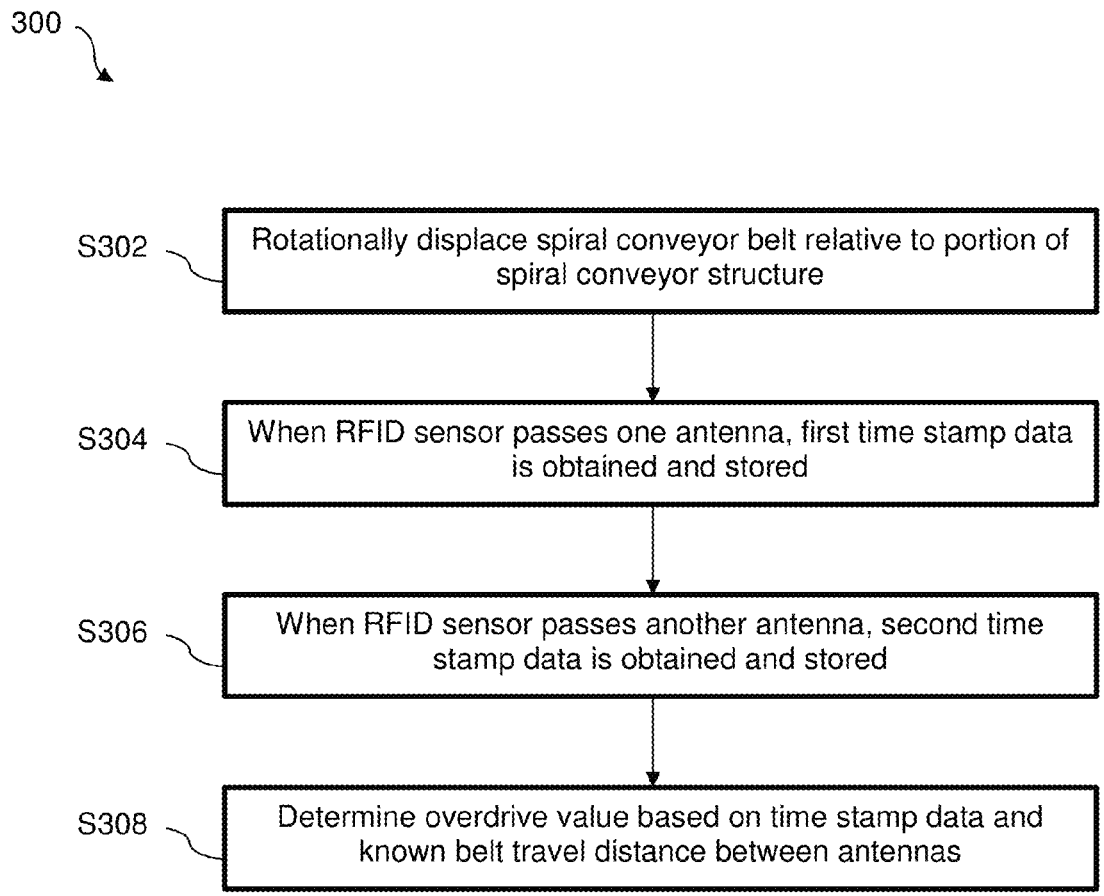
FIG. 3 shows an illustrative method of using a conveyor belt system.

FIG. 3 shows an illustrative method 300 of using a conveyor belt system.

The method 300 includes rotationally displacing the spiral conveyor belt 100 relative to a portion of the spiral conveyor structure 200 at step S302. When the RFID sensor passes one of the antennas 202, first time stamp data is obtained and stored at step S304. In an illustrative embodiment, time stamp data is generated by the reader. When the RFID sensor passes another antenna 202, second time stamp data is obtained and stored at step S306.

In an illustrative embodiment, the method 300 further comprises determining an overdrive value, based on the first and second time stamp data, and based on a known distance of spiral conveyor belt travel between the antennas 202, at step S308.

The determining of the overdrive value comprises: determining a travel speed of the spiral conveyor belt 100, determining a value related to a time for the spiral conveyor belt 100 to complete a single revolution, and determining a tangential speed of a central drum portion 206 of the spiral conveyor structure 200.

In an illustrative embodiment, the value related to a time for the spiral conveyor belt 100 to complete a single revolution is an average value determined from time measurements over one or several revolutions. For example, the value related to a time for the spiral conveyor belt 100 to complete a single revolution is an average value determined from time stamp data over one or several revolutions.

In an illustrative embodiment, the tangential speed of the central drum portion 206 can be determined based on the drum diameter and the number of revolutions per minute (RPM) of a motor of the central drum portion 206. Determining the overdrive value further comprises determining a difference between the travel speed of the spiral conveyor belt 100 and the tangential speed of the central drum portion 206, and multiplying the difference by the value related to a time for the spiral conveyor belt 100 to complete a single revolution.

One or more of the foregoing steps can be performed by a computer including a processor and a non-transitory computer readable storage medium in communication or integral with the reader associated with the antennas 202.

In an illustrative embodiment, the data captured and stored by the reader as described will provide the necessary information to dynamically calculate the overdrive of a spiral cage system at least once per full travel of the belt through the spiral conveyor. The information obtained is thus useful to gauge and monitor important performance parameters of the conveyor.

It will be appreciated by those skilled in the art that the disclosure herein can be embodied in other specific foams without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A conveyor belt system comprising:
   a spiral conveyor belt;
   a spiral conveyor cage structure adjacent the spiral conveyor belt;
   a sensor integral to the spiral conveyor belt;
   a plurality of antennas of a reader, the antennas being attached to the spiral conveyor structure;
   a non-transitory computer readable storage medium; and
   a processor configured to (i) obtain and store, in the storage medium, first time stamp data when the spiral conveyor belt is rotationally displaced relative to a portion of the spiral conveyor structure and the RFID sensor passes one of the plurality of antennas, and (ii) obtain and store, in the storage medium, second time stamp data when the spiral conveyor belt is rotationally displaced relative to the portion of the spiral conveyor structure and the RFID sensor passes an other one of the plurality of antennas.

2. The conveyor belt system of claim 1, wherein the spiral conveyor cage structure comprises an outer portion and an inner drum portion configured to rotate relative to the outer portion.

3. The conveyor belt system of claim 1, wherein the sensor comprises an RFID sensor which is integral to an outer edge of the spiral conveyor belt.

4. The conveyor belt system of claim 3, wherein the antennas are positioned at fixed points on the spiral conveyor cage structure, within range of the RFID sensor, but separated from each other so as not to overlap or minimally overlap coverage of the antennas.

5. The conveyor belt system of claim 1, wherein the spiral conveyor belt is a side-flexing conveyor belt.

6. The conveyor belt system of claim 1, wherein the sensor comprises a passive RFID device.

7. A method of using a conveyor belt system, comprising:
   providing a conveyor belt system comprising a spiral conveyor belt, a spiral conveyor cage structure adjacent the spiral conveyor belt, an RFID sensor integral to the spiral conveyor belt, and a plurality of antennas of a reader, the antennas being attached to the spiral conveyor structure;
   rotationally displacing the spiral conveyor belt relative to a portion of the spiral conveyor structure;
   obtaining and storing first time stamp data when the RFID sensor passes one of the plurality of antennas; and
   obtaining and storing second time stamp data when the RFID sensor passes an other one of the plurality of antennas.

8. The method of using the conveyor belt system of claim 7, further comprising:
   determining an overdrive value based on the first and second time stamp data, and based on a known distance of spiral conveyor belt travel between the one of the plurality of antennas and the other one of the plurality of antennas.

9. The method of using the conveyor belt system of claim 8, wherein the determining of the overdrive value comprises:
   determining a travel speed of the spiral conveyor belt;
   determining a value related to a time for the spiral conveyor belt to complete a single revolution;
   determining a tangential speed of a central drum portion of the spiral conveyor cage structure; and
   determining a difference between the travel speed of the spiral conveyor belt and the tangential speed of the central drum portion, and multiplying the difference by the value related to a time for the spiral conveyor belt to complete a single revolution.

* * * * *